United States Patent [19]

Kugler et al.

[11] 4,070,240
[45] Jan. 24, 1978

[54] SEAL CONTAINMENT SYSTEM

[75] Inventors: Ralph W. Kugler; Kenneth S. Gerkey, both of Mount Lebanon; William H. Kasner, Penn Hills, all of Pa.

[73] Assignee: Westinghouse Electric Corporation, Pittsburgh, Pa.

[21] Appl. No.: 765,032

[22] Filed: Feb. 2, 1977

[51] Int. Cl.² .............................................. G21C 3/02
[52] U.S. Cl. .................................. 176/66; 176/30; 176/37
[58] Field of Search .................................. 176/30–32, 176/37, 66, 67

[56] References Cited

U.S. PATENT DOCUMENTS

| | | | |
|---|---|---|---|
| 3,372,213 | 3/1968 | Nishiyama et al. | 264/.5 |
| 3,501,377 | 3/1970 | Germer | 176/66 X |
| 3,654,970 | 4/1972 | Teboul | 264/.5 |
| 3,773,376 | 11/1973 | Orange | 176/30 X |
| 3,890,233 | 6/1975 | Gischel | 176/30 X |
| 3,958,699 | 5/1976 | Medlin | 176/32 X |

Primary Examiner—Peter A. Nelson
Attorney, Agent, or Firm—L. A. DePaul; Z. L. Dermer

[57] ABSTRACT

An automated system for transporting nuclear fuel elements between fuel element assembly stations without contaminating the area outside the sealed assembly stations. The system comprises a plurality of assembly stations connected together by an elongated horizontal sealing mechanism and an automatic transport mechanism for transporting a nuclear fuel element in a horizontal attitude between the assembly stations while the open end of the fuel element extends through the sealing mechanism into the assembly station enclosure. The sealing mechanism allows the fuel element to be advanced by the transport mechanism while limiting the escape of radioactive particles from within the assembly station enclosure.

4 Claims, 6 Drawing Figures

SEAL CONTAINMENT SYSTEM

BACKGROUND OF THE INVENTION

This invention relates to the assembly of nuclear fuel elements and particularly to the automatic assembly of nuclear fuel elements employing mixed oxide fuels.

In many designs of nuclear reactors, the reactor vessel has an inlet and an outlet for circulation of a coolant in heat transfer relationship with a core contained therein that produces heat. The core comprises an array or arrays of fuel assemblies which contain fuel elements. The fuel element is generally a cylindrical metallic sheath sealed at both ends containing nuclear fuel. The nuclear fuel which may be, for example, ceramic fuel pellets of a uranium compound is stacked in the fuel elements. During reactor operation, the nuclear fuel pellets decompose releasing fission products such as fission gas while generating heat in a manner well known in the art. The reactor coolant absorbs the heat while circulating through the core thereby cooling the fuel elements of the core and heating the coolant. Of course, the heated coolant may then be used to produce power in a conventional manner.

There are several methods known in the art for loading uranium fuel pellets into the cylindrical metallic sheath for use in a light water reactor. One such method comprises simply placing the fuel pellets in the metallic sheath by hand. This method is possible because non-irradiated uranium fuel does not pose serious radiological problems to working personnel. However, when the nuclear fuel utilized is of a more toxic nature such as plutonium or a reprocessed uranium compound, then increased safeguards must be employed to prevent releasing radioactive contaminants to the atmosphere and to prevent overexposing working personnel. When such toxic fuel is employed, it is known in the art to use glove box handling techniques to load the fuel pellets into the metallic sheath.

Typical glove box handling procedure first requires transferring the nuclear fuel pellets in a sealed container into the glove box and then firmly sealing the glove box. Once placed in the glove box, the sealed container may then be opened by manual gloved manipulation. The fuel pellets may then be loaded into a metallic sheath either totally enclosed within the glove box, or with its open end sealed into a glove box through a plastic membrane. When the metallic sheath has thus been filled to the proper level with fuel pellets, the fuel element must then be placed in a sealed container or its contaminated open end sealed off in order to be moved to the next glove box where the next procedure can be performed such as welding the end plug on the metallic sheath. The process of tranferring the material and components from one glove box to the next can be quite time consuming and thus renders such procedures unacceptable from a mass production standpoint.

An example of an arrangement for transferring nuclear fuel elements into a glove box enclosure is described in U.S. Pat. No. 3,711,993 to J. Liesch et al, issued Jan. 23, 1973. The Liesch patent discloses a cylindrical chamber disposed in an isolation wall between a contaminated and an uncontaminated area for providing a passageway therebetween. The chamber is enclosed between a pair of shutters with variable apertures that allow the passage of a nuclear fuel element therethrough. The chamber may be flushed or purged with a gas so as to entrain contaminated particles in the gas which may then be conducted through a filter located remote from the chamber thereby trapping the contaminated particles in the filter. The patent to Liesch indicates that such a filter may be of the electrostatic or activated carbon type. While the Liesch patent describes a particular arrangment for transferring a nuclear fuel element into or out of a glove box type enclosure, it along with the other prior art does not solve the problem of automatically transferring nuclear fuel elements between assembly stations on a mass production basis without releasing contaminants into the atmosphere.

SUMMARY OF THE INVENTION

An automated system for transporting nuclear fuel elements between fuel element assembly stations without contaminating the area outside the sealed assembly stations. A plurality of assembly stations wherein the fuel element is loaded with nuclear fuel and sealed are connected together by an elongated horizontal sealing mechanism. An automatic transport mechanism for transporting the fuel element in a horizontal attitude between the assembly stations is arranged so that the open end of the fuel element extends through the sealing mechanism into the assembly station enclosure. The sealing mechanism allows the fuel element to be advanced by the transport mechanism while limiting the escape of radioactive particles from within the assembly station enclosure.

It is an object of this invention to provide an automated system for assembling nuclear fuel elements.

It is another object of this invention to provide a sealing mechanism whereby a fuel element may be automatically advanced along it without releasing excessive contaminants.

It is a particular object of this invention to provide an automated system for assembling nuclear fuel elements having a sealing mechanism whereby a fuel element may be automatically advanced without releasing excessive contaminants.

BRIEF DESCRIPTION OF THE DRAWINGS

While the specification concludes with claims specifically pointing out and distinctly claiming the subject matter of the invention, it is believed the invention will be better understood from the following description taken in conjunction with the accompanying drawings, wherein:

DESCRIPTION OF THE PREFERRED EMBODIMENT

The prior art concepts for assembling nuclear fuel elements utilizing plutonium fuel involved separate operations performed in isolated glove box enclosures. The invention described herein provides an automated system for transporting the fuel element between assembly stations without contaminating the area outside the sealed assembly stations.

Figure 1:
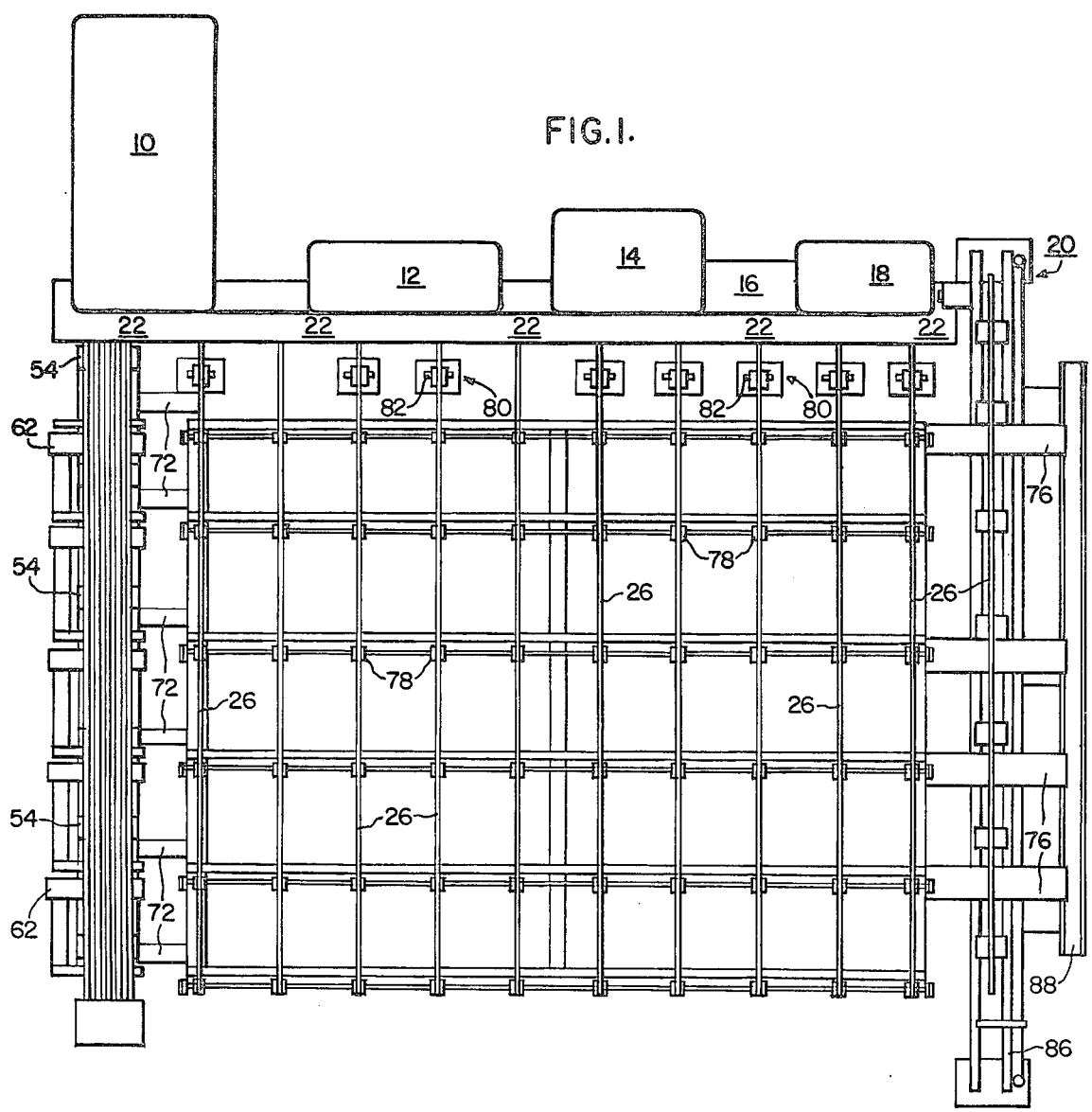
FIG. 1 is a plan view of the automated system.
Figure 2:
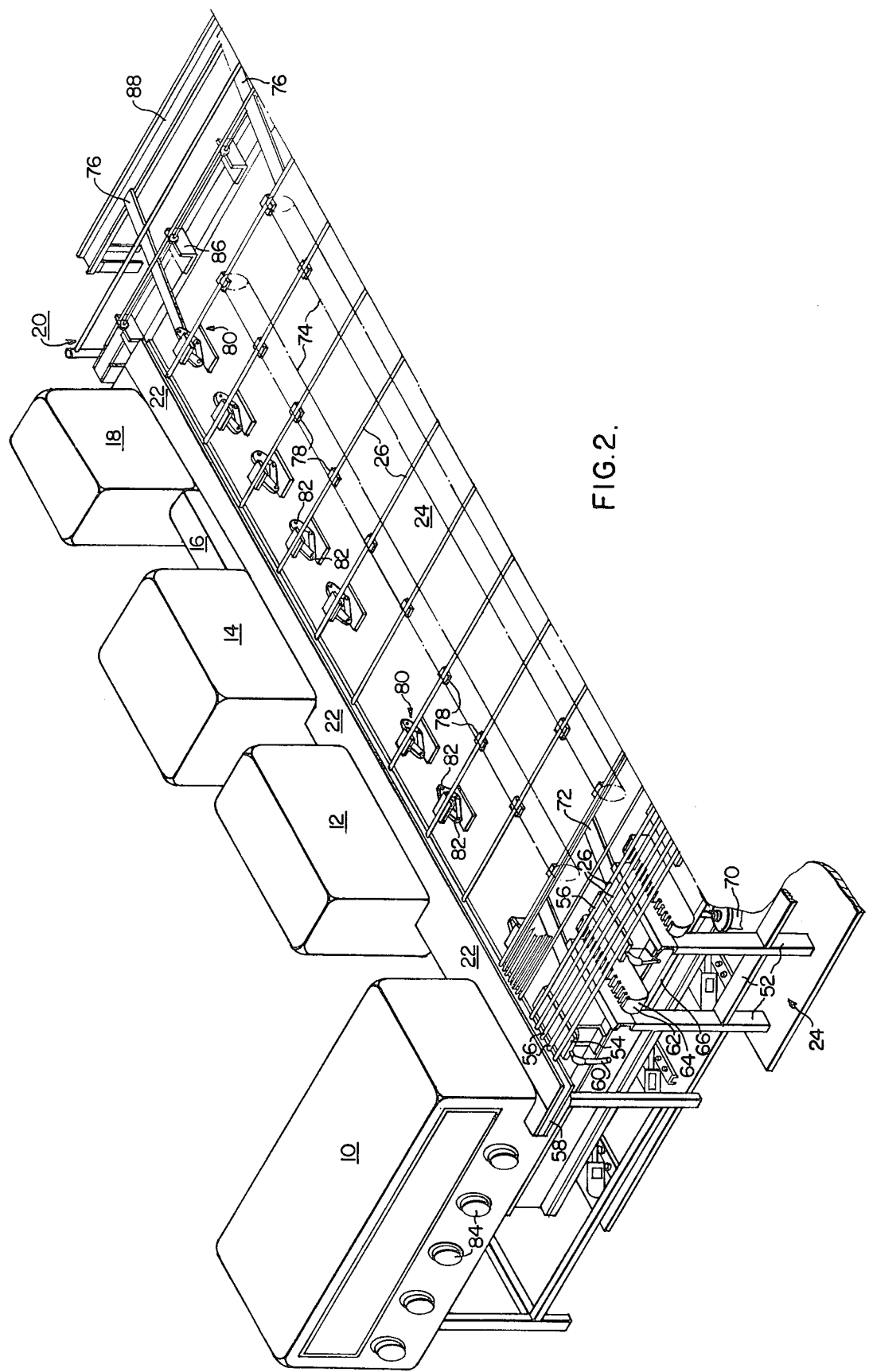
FIG. 2 is a view in perspective of the assembly portion of the system.
Figure 3:
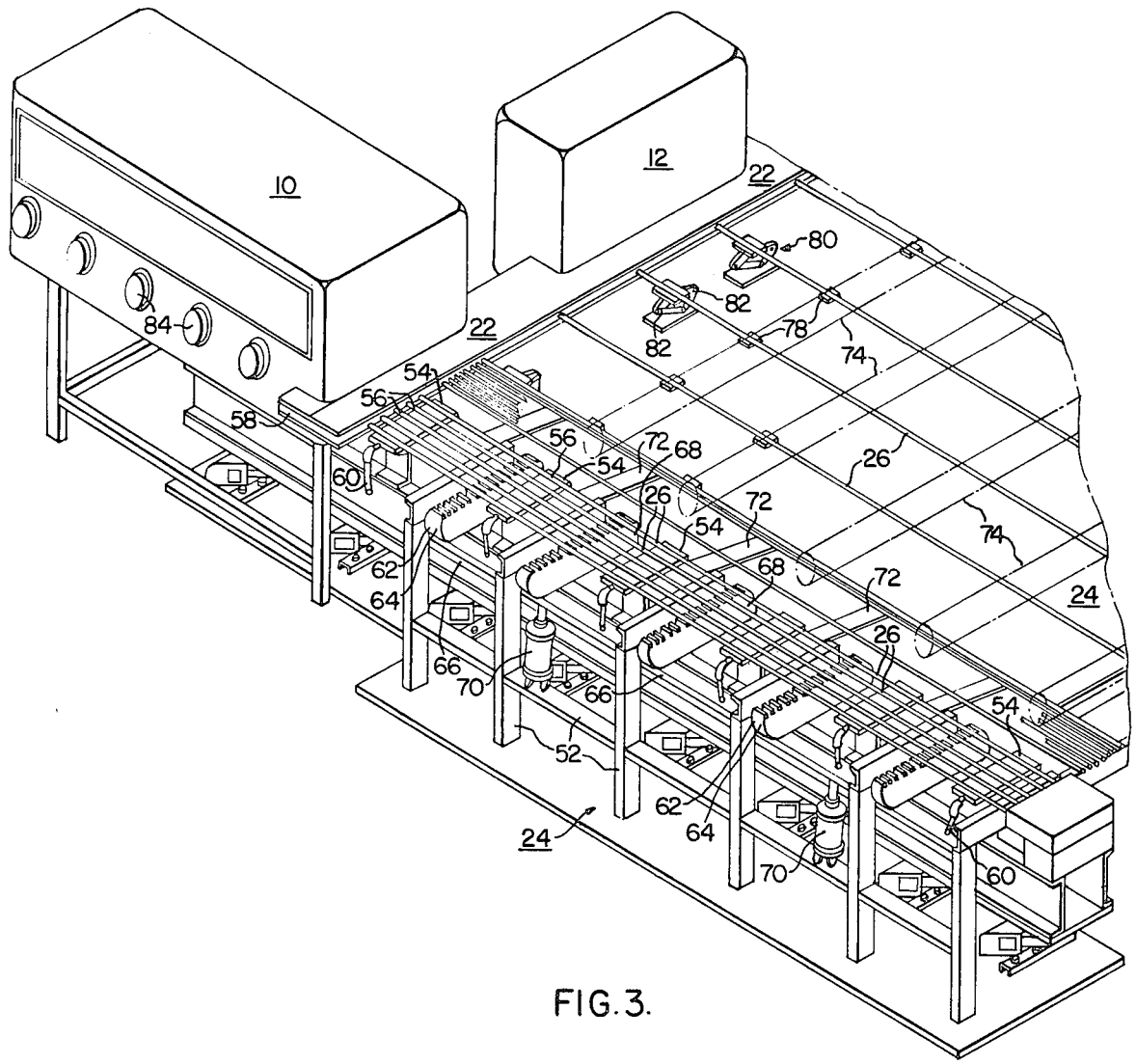
FIG. 3 is a view in perspective of the entry portion of the system.

Referring to FIGS. 1, 2 and 3, a load station 10, decontamination station 12, plug station 14, first check station 16, weld station 18, and second check station 20 are arranged along a long horizontal sealing mechanism 22 such that the open end of each station may be connected to sealing mechanism 22 in a fluid-tight fashion. A transport mechanism 24 is arranged adjacent to sealing mechanism 22 so that fuel elements 26 may be supported thereon in a horizontal attitude with the open ends of fuel elements 26 extending through sealing mechanism 22 and into the several assembly stations such as load station 10. Transport mechanism 24 is capable of automatically advancing fuel elements 26 from load station 10 to second check station 20 while the fuel elements 26 remain in a horizontal position so that the internals of the fuel element 26 may be placed in fuel element 26.

Figure 4:
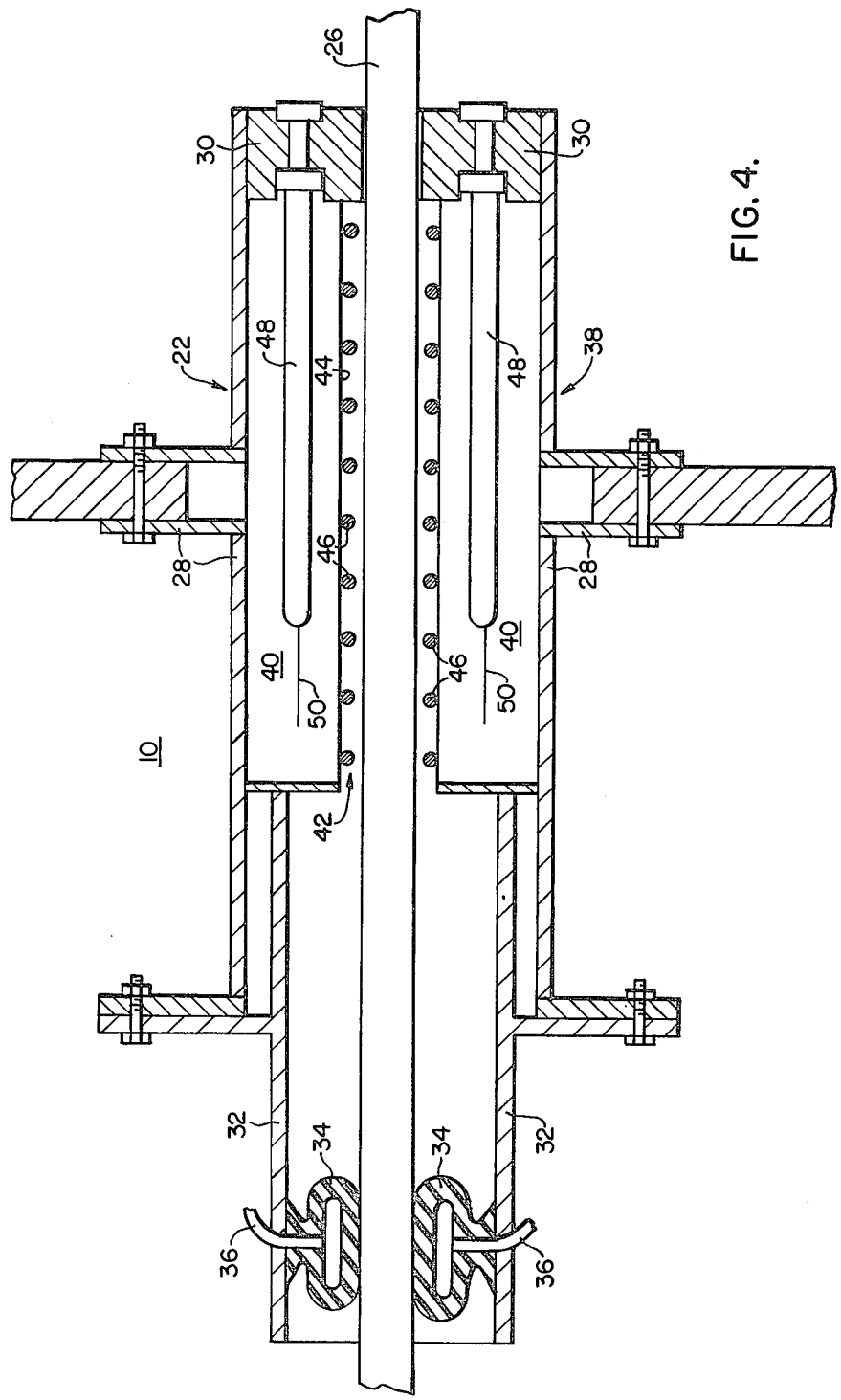
FIG. 4 is a cross-sectional view of the sealing mechanism.
Figure 5:
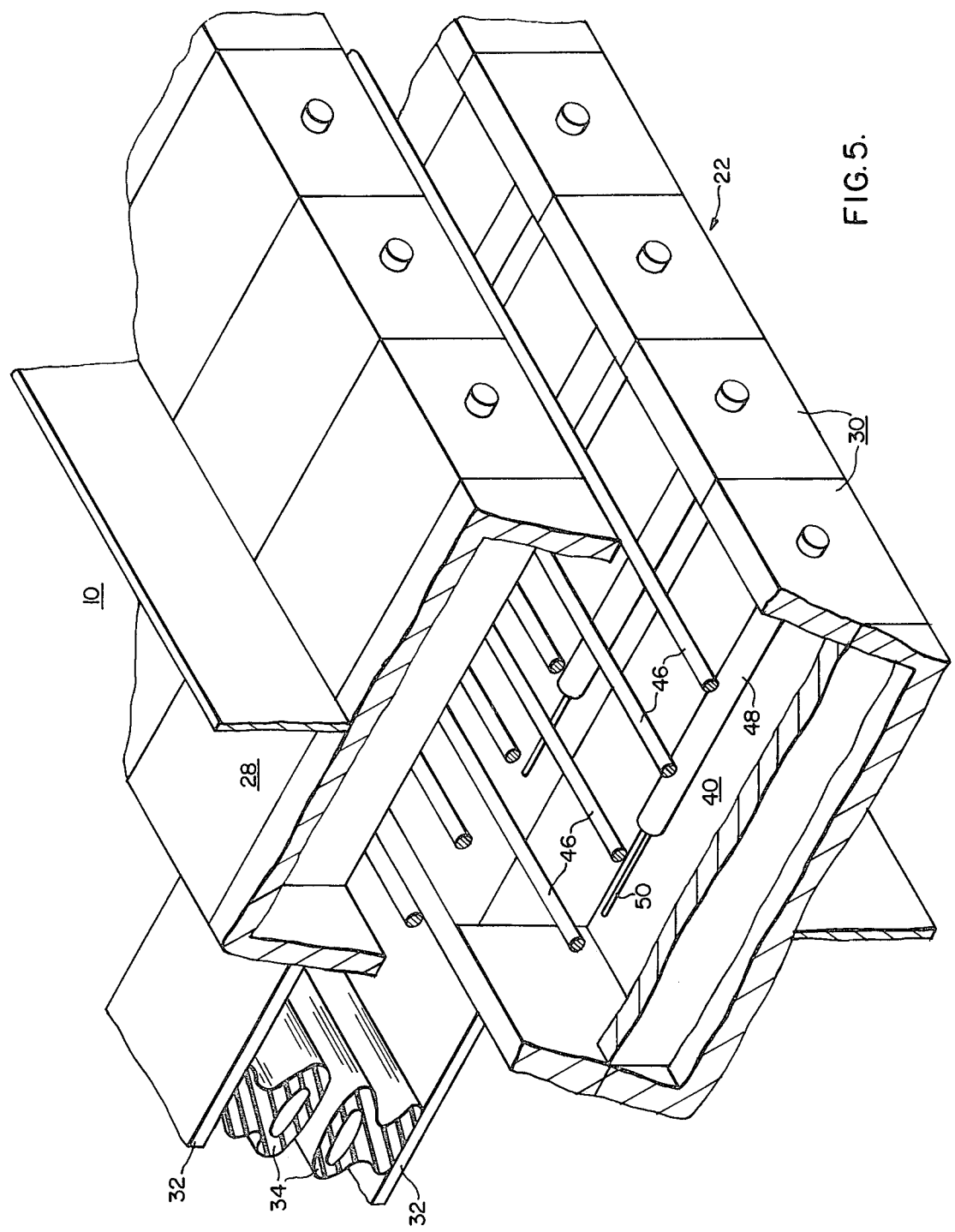
FIG. 5 is a partial view in perspective of the sealing mechanism.

Referring now to FIGS. 4 and 5, sealing mechanism 22 includes a housing 28 which is attached to the walls of the various assembly stations such as load station 10. A series of end plates 30 are attached to the end of housing 28 near transport mechanism 24 while the other end of housing 28, that extends into the assembly station, is formed in a slot configuration 32. Slot configuration 32 establishes a small cross-sectional area with respect to the assembly station and thereby limits the outward flow of particles from the assembly station. Two elongated inflatable seals 34 are attached to housing 28 in slot configuration 32 so as to oppose each other and extend the length of sealing mechanism 22. Inflation mechanism 36 which may be chosen from those well known in the art such as a gas inflation mechanism is attached to inflatable seals 34 so that inflatable seals 34 may be inflated into close contact with each other thereby closing the entrance to housing 28 and thus limiting the escape of particles from within the assembly station. Inflatable seals 34 are chosen from suitable material such that when a fuel element 26 extends between the inflated seals, the inflated seals substantially conform to the curvature of fuel element 26 thereby closing the entrance to housing 28. In addition, the pressure inside the assembly stations such as load station 10 is maintained lower than the pressure in the room that contains transport mechanism 24 so that any flow of air through sealing mechanism 22 will be inwardly toward the assembly stations. This positive inflow of air further limits any contaminating particles from migrating out from within the assembly stations.

Still referring to FIGS. 4 and 5, an electrostatic seal 38 is disposed in housing 28 at the end opposite inflatable seals 34 and extends the length of sealing mechanism 22. Electrostatic seal 38 comprises arrays of individual electrostatic precipitator cells 40 which may be manufactured of aluminum located above and below an open slot 42 through which fuel element 26 extends. Precipitator cells 40 are in the form of rectangular metal boxes having dimensions of approximately 1 inch × 1 inch 33 6 inches. The side 44 of each precipitator cell 40 facing open slot 42 is open so that air can freely move into and out of precipitator cell 40. A series of 0.125 inch diameter metal rods 46 are spaced apart and arranged transverse to precipitator cells 40 thereby forming a protective shield which will prevent large objects from accidentally falling into precipitator cells 40 while allowing air to move freely thereacross. End plates 30 which may be manufactured from an insulating material serves as insulating supports for electrodes 48 which are attached thereto by common means. Common electrical leads (not shown) may be attached to electrodes 48 to apply a voltage to electrodes 48. Electrodes 48 are cylindrical high voltage electrodes that support a one inch long tungsten wire 50 on the end thereof opposite end plates 30. When a high d.c. voltage, typically 6–10 kV, is applied to electrodes 48 a corona discharge is produced around the tip of tungsten wire 50. As a result of the corona discharge, a region of high electrostatic space charge is produced at the end of precipitator cell 40 near tungsten wire 50. Any airborne particulate matter that flows through this region becomes electrostatically charged and is attracted to the metal walls of the precipitator cells 40 or to rods 46 and is thereby deposited out of the air stream. While the bulk air stream is maintained inwardly through open slot 42 and into the assembly stations due to pressure difference, back stream diffusion of particles opposite to this bulk flow may occur due to differences in concentration of particles in the assembly stations and in the area outside sealing mechanism 22. Thus, if particulates such as nuclear fuel dust, tend to flow in reverse direction to the bulk air flow, the particulates have a high probability of entering the precipitator cells 40 and becoming captured therein or on rods 46. Tests conducted on a small precipitator arrangement similar to the one described herein indicate that the probability of capture for particles in the size range 0.3 to 1.0 microns and 1.0 to greater than 10.0 microns is approximately 98.5% and 99.8% respectively, for flow velocities up to approximately 150 ft/min. Once the opened end of a fuel element 26 has been positioned in an assembly station such as load station 10, the inflatable seals 34 may be inflated thereby closing the end of slot configuration 32. Should the inflatable seals 34 not close perfectly around the fuel element 26, the constant inward flow of air will limit leakage through any gaps between the seals and fuel element. Furthermore, should any particulate contamination diffuse in a reverse manner to the bulk air flow, the electrostatic seal 38 will further limit escape of such contaminants. When the process is completed, the inflatable seals 34 are deflated and the transport mechanism 24 advances the fuel element 26 to the next assembly station while the opened end of the fuel element remains within sealing mechanism 22. During such movement of the fuel element 26 when the inflatable seals 34 are deflated, the inflow of air together with the electrostatic seal 38 and slot configuration 32 sufficiently limit the escape of contaminants. Sealing mechanism 22, therefore, allows fuel elements to extend therethrough and into an assembly station both during process operation and during transport while limiting the escape of contaminants from within the assembly station.

Figure 6:
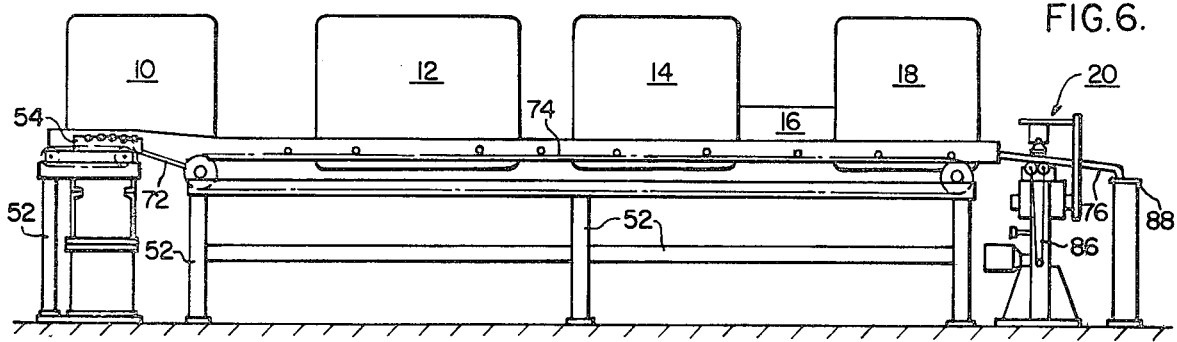
FIG. 6 is an end view in elevation of the assembly.

Referring again to FIGS. 1, 2 and 3 and to FIG. 6, transport mechanism 24 includes structural members 52 that support the apparatus of transport mechanism 24. Pneumatic holding members 54 having grooves 56 conforming to the curvature of a fuel element are disposed at several locations in line with load station 10 for holding several fuel elements 26 such that the open end of fuel element 26 extends through sealing mechanism 22 while the remainder of the fuel element including the sealed end is supported by pneumatic holding members 54. The open end of an uncontaminated fuel element 26 may be inserted through opening 58 of sealing mechanism 22 while the fuel element rests on pneumatic holding members 54. A vacuum pump (not shown) is connected to pneumatic holding member 54 by vacuum line 60. Vacuum line 60 extends through pneumatic holding member 54 to the underside of grooves 56 so that when a fuel element is placed in grooves 56 the vacuum pump may be activated thereby creating a suction in grooves 56 and thus holding the fuel elements firmly in place. Roller chain members 62 which may consist of attachments for the fuel elements that are attached to a roller driven chain are disposed between pneumatic holding members 54 so as to further support the fuel elements and, when activated, are capable of advancing the fuel elements. Roller chain member 62 has a first end 64 and a second end 68 that rest on a horizontal bar 66 with both ends being movably connected to structural members 52. Horizontal bar 66 is supported thereunder by lifting mechanisms 70 which may be a mechanical-pneumatic piston arrangement. When the vacuum pump (not shown) is deactivated which thereby enables the fuel element to be released from grooves 56, then lifting mechanism 70 may be activated which raises horizontal bar 66 which in turn raises roller chain members 62. This action causes roller chain member 62 to be raised slightly higher than pneumatic holding members 54 which causes the fuel elements thereon to be lifted out of grooves 56. Roller chain members 62 may then be activated which moves each fuel element toward second end 68 and onto first ramps 72. Several fuel elements may be collected on first ramps 72.

A conveyor 74 is supported by structural members 52 and arranged adjacent to first ramps 72 to carry fuel elements 26 from first ramps 72 to second ramps 76 located near the end of the assembly station line. Conveyor 74 has holders 78 disposed thereon that are capable of holding a fuel element during transport on conveyor 74. As conveyor 74 operates, holders 78 grasp the lowermost fuel element 26 on first ramps 72 and carry the fuel element until the conveyor 74 is stopped. A control mechanism (not shown) may be chosen from those well known in the art that is capable of stopping conveyor 74 at appropriate locations so that the fuel element becomes aligned with the proper assembly station. Several grapple mechanisms 80 are located at locations corresponding to the assembly stations that are capable of firmly grasping a fuel element so that an assembly process may be performed. Grapple mechanisms 80 may have articulated arms 82 that are capable of being retracted below the plane of conveyor 74 so that the fuel element may pass above it. However, when conveyor 74 has stopped a fuel element at the proper location, the articulated arms 82 can be extended so as to firmly grasp the fuel element. In addition, grapple mechanism 80 may be equipped to be able to advance the fuel element toward the assembly station thereby increasing the length of fuel element disposed within the assembly station. When the fuel element has been transported to the end of the process, conveyor 74 allows the fuel element to roll down second ramps 76.

OPERATION

Several uncontaminated empty fuel elements 26 are inserted through opening 58 and onto pneumatic holding member 54 by hand. The fuel elements generally may be cylindrical tubes with the top end open and the bottom end sealed. The top end which is open is the end inserted through opening 58 and through sealing mechanism 22 into load station 10. At this point the inflatable seals 34 are deflated so that the fuel elements may be easily inserted through electrostatic seal 38 and between the deflated inflatable seals 34. In this position, the open end of the fuel elements 26 extend between the deflated inflatable seals 34 and into load station 10. During this part of the process, the electrostatic seals 38 are activated while a flow of air is maintained inwardly, as previously described. At this point, the inflatable seals 34 are inflated thereby tightly contacting the fuel elements 26 and sealing the slot configuration 32. At the same time, the vacuum pump is activated which causes the fuel elements to be held firmly in grooves 56 by a suction action. Load station 10 contains automatic equipment chosen from those well known in the art that is capable of loading nuclear fuel pellets through the open end of the fuel element and stacking the fuel pellets in the fuel element. Because load station 10 contains nuclear fuel pellets which may contain plutonium, it is important that the assembly station be tightly sealed so that contaminants do not leak out into the area of transport mechanism 24 where personnel may become exposed. Load station 10 along with the other stations has glove ports 84 that provide working personnel with access to the inside of the stations. Glove ports 84 may be utilized to repair or arrange the equipment therein. Once the fuel elements have been loaded with fuel pellets, inflatable seals 34 are deflated and the vacuum pump is deactivated. Lifting mechanism 70 may then be activated which raises horizontal bar 66 and in turn raises roller chain member 62. This action causes roller chain member 62 to be raised slightly higher than pneumatic holding members 54 which causes the fuel element thereon to be lifted out of grooves 56. Roller chain member 62 may then be activated which causes the fuel elements to be advanced toward second end 68 and onto first ramps 72. The fuel elements are thus collected on first ramps 72 while additional fuel elements are loaded into load station 10 as described above. Since the open end of the fuel elements were exposed to contaminants while inside the load station 10, it is necessary to maintain that end within sealing mechanism 22. Between assembly stations, sealing mechanism 22 has a closed back end opposite the end through which the fuel elements extend which thereby maintains the open end of the fuel element within a sealed compartment between assembly stations. While the open end of the fuel element remains within sealing mechanism 22 and while the remainder of the fuel element remains on first ramps 72, holders 78 on conveyor 74 engage the fuel element nearest the bottom of first ramps 72 and carry the fuel element to decontamination station 12. At this point, conveyor 74 is stopped and articulated arms 82 are extended thereby firmly grasping the fuel element. Grapple mechanism 80 may then advance the fuel element further into decontamination station 12 so that a greater portion of the fuel element is within decontamination station 12 than was exposed in load station 10. The inflatable seals 34 are then inflated further sealing the decontamination station 12. Automated machinery located in decontamination station 12 and chosen from those well known in the art may then be utilized to clean the portion of the fuel element that is within the station thereby removing contaminants. The inflatable seals 34 are then deflated while grapple mechanism 80 releases the fuel element. Conveyor 74 may then move the fuel element to another location within the same station or move it to the next station which may be plug station 14.

Once properly located within plug station 14, the inflatable seals 34 are inflated and grapple mechanism 80 activated. Following this positioning, the process of plug station 14 may then be performed. The process of plug station 14 may include loading a spring into the fuel element along with other components and tightly fitting a plug into the end of the fuel element. Following the same procedure as described above the fuel element may then be moved to first check station 16 where a contamination check such as an alpha check may be performed on the end of the fuel element using state of the art equipment. The fuel element may then proceed to weld station 18 where the end plug may be welded onto the fuel element. When the end plug has thus been welded on the fuel element, the fuel element may then be removed from sealing mechanism 22 without risking exposure to personnel because the nuclear fuel is tightly sealed in the fuel element. From weld station 18, conveyor 74 moves the fuel element to the end of conveyor 74 and discharges the fuel element onto second ramps 76 where the fuel element rolls down the ramp onto support apparatus 86. Support apparatus 86 serves to position the fuel element and provide a base for second check station 20. Second check station 20 may consist of an automatic alpha check mechanism such as an alpha scintillation counter that may move along the length of the fuel element while being supported by support apparatus 86. During such movement of the alpha check mechanism, support apparatus 86 may rotate the fuel element thereon so that a full length alpha check of the fuel element may be made. Should the full length alpha check prove negative, the support apparatus 86 will release the fuel element thereby allowing the fuel element to roll down the remainder of second ramp 76 into collection rack 88. When a sufficient number of fuel elements have been collected in collection rack 88, a person may then remove the fuel elements by hand without exposing himself to radiation danger. Of course, the above-described processes are performed concurrently on different fuel elements in the system so as to produce an automated system. The invention, therefore, provides an automated system for assembling nuclear fuel elements having a sealing mechanism whereby a fuel element may be automatically advanced without releasing excessive contaminants.

While there is described what is now considered to be the preferred embodiment of the invention, it is, of course understood that various other modifications and variations will occur to those skilled in the art. The claims, therefore, are intended to include all such modifications and variations which fall within the true spirit and scope of the present invention. For example, an additional set of inflatable seals 34 may be provided in housing 28 near transport mechanism 24 that would further increase the sealing effect of sealing mechanism 22.

We claim:

1. An automated system for assembling nuclear fuel elements including transporting nuclear fuel elements between fuel element assembly stations comprising:

a fuel pellet load station containing fuel pellet loading apparatus and having an open horizontal slot in the side thereof for accommodating the insertion of the open end of said fuel element for loading fuel pellets into said fuel element;

a plug insertion station arranged near said fuel pellet load station containing end plugs and welding apparatus and having an open horizontal slot in the side thereof for accommodating the insertion of the open end of said fuel element for inserting said end plug into said open end of said fuel element thereby sealing said fuel pellets in said fuel element;

sealing means connected to said open horizontal slots of said assembly stations for connecting said assembly stations together and for sealing said open horizontal slots while said fuel element extends therethrough and into said assembly station; and, transport means arranged along said sealing means for transporting said fuel elements between said assembly stations without removing said fuel element from within said sealing means, said sealing means limiting release of radioactive contaminants from within said assembly stations during said transport.

2. The system according to claim 1 wherein said sealing means comprises:

a housing having a first end connected to said slots of said assembly stations thereby sealing said assembly stations and having a second end defining a horizontal opening extending the length of the line defined by said assembly stations;

an elongated first inflatable seal attached to the top of said first end of said housing and extending the length of said housing;

an elongated second inflatable seal attached to the bottom of said first end of said housing opposite to said first inflatable seal and extending the length of said housing, said first and second inflatable seals capable of being inflated into contact with each other thereby closing said horizontal opening; and an electrostatic seal attached to said housing in series with said inflatable seals for trapping contaminated particles by electrostatic precipitation, said system limiting the release of radioactive contaminants from within said assembly stations during said transport.

3. The system according to claim 2 wherein said electrostatic seal comprises:

electrostatic precipitator cells located in the top and bottom of said housing and having an open side for allowing electrostatically charged particles to enter said cells and to precipitate out on the walls of said cells;

electrodes attached to said second end of said housing and extending toward said first end of said housing and disposed in said cells for electrostatically charging particles passing near said electrodes; and rods arranged transverse to said electrodes defining a passageway for the insertion of said fuel elements while protecting against damage to said electrodes.

4. The system according to claim 3 wherein said transport means comprises:

a conveyor mechanism arranged adjacent to said sealing means for transporting said fuel elements between said assembly stations without removing said fuel element from within said sealing means;

holding apparatus disposed on said conveyor mechanism for securing said fuel element during said transport; and a grapple mechanism arranged near said assembly stations for firmly grasping said fuel element during an assembly process and for advancing said fuel element toward said assembly station thereby adjusting the length of said fuel element contained within said assembly station.

* * * * *